US011865386B2

(12) United States Patent
Malovec

(10) Patent No.: US 11,865,386 B2
(45) Date of Patent: Jan. 9, 2024

(54) AUTOMATIC FIRE SELF-EXTINGUISHING DEVICE AND FIRE PROTECTION METHOD

(71) Applicant: Roman Malovec, Bratislava (SK)

(72) Inventor: Roman Malovec, Bratislava (SK)

( * ) Notice: Subject to any disclaimer, the term of this patent is extended or adjusted under 35 U.S.C. 154(b) by 712 days.

(21) Appl. No.: 16/305,420

(22) PCT Filed: May 31, 2017

(86) PCT No.: PCT/IB2017/053196

§ 371 (c)(1),
(2) Date: Nov. 29, 2018

(87) PCT Pub. No.: WO2017/208166

PCT Pub. Date: Dec. 7, 2017

(65) Prior Publication Data

US 2021/0220682 A1 Jul. 22, 2021

(30) Foreign Application Priority Data

May 31, 2016 (SK) ............................ 50073-2016 U

(51) Int. Cl.
*A62C 35/10* (2006.01)
*A62C 3/16* (2006.01)
*A62C 3/07* (2006.01)

(52) U.S. Cl.
CPC ................ *A62C 35/10* (2013.01); *A62C 3/16* (2013.01); *A62C 3/07* (2013.01)

(58) Field of Classification Search
CPC .............. A62C 35/10; A62C 3/16; A62C 3/07
USPC ............................................................ 169/26
See application file for complete search history.

(56) References Cited

U.S. PATENT DOCUMENTS 292,532 A * 1/1884 Beggs ...................... G01F 23/36
3,827,502 A * 8/1974 Lockwood ............. A62C 35/10 169/51
4,752,019 A * 6/1988 Walker .................... G01F 23/34 116/228

(Continued)

FOREIGN PATENT DOCUMENTS

CN 203447673 U * 2/2014 ............... A62C 3/07
CN 203507380 U * 4/2014 ............. A62C 37/14

(Continued)

OTHER PUBLICATIONS

Machine Translation of CN-203447673-U Description, Jul. 28, 2021, Google Patents, 8 Pages (Year: 2021).*

(Continued)

*Primary Examiner* — Tuongminh N Pham
*Assistant Examiner* — Kevin Edward Schwartz
(74) *Attorney, Agent, or Firm* — Defillo & Associates, Inc; Evelyn A. Defillo

(57) ABSTRACT

An automatic self-extinguishing fire device including an extinguishing substance, and a hose closed on both ends by pressed endings. The extinguishing substance is inside the hose. At least one of the endings of the hose has a closing screw. A pressure valve for filling by the extinguishing substance inside the hose is located on one of the endings of the hose. The extinguishing substance in the hose is under pressure and the hose is at least partially transparent in order to observe an inner content of the hose.

9 Claims, 4 Drawing Sheets

(56) References Cited

U.S. PATENT DOCUMENTS

| | | | | | |
|---|---|---|---|---|---|
| 4,905,950 | A * | 3/1990 | Turner | A62C 13/78 248/229.1 |
| 5,441,113 | A * | 8/1995 | Pierce | A62C 37/21 169/5 |
| 6,161,624 | A | 12/2000 | Bennett | |
| 6,902,009 | B1 * | 6/2005 | Meserve | A62C 3/004 169/30 |
| 6,981,555 | B2 * | 1/2006 | Smith | A62C 37/40 169/59 |
| 7,155,347 | B2 * | 12/2006 | Going | A62C 35/08 702/30 |
| 8,402,985 | B2 * | 3/2013 | Schmalfuss | A62C 37/14 137/72 |
| 2004/0226726 | A1 * | 11/2004 | Holland | A62C 3/07 169/62 |
| 2008/0087446 | A1 * | 4/2008 | Sitabkhan | A62C 37/12 169/57 |
| 2008/0289831 | A1 * | 11/2008 | Kaimart | A62C 3/025 169/36 |
| 2012/0032793 | A1 * | 2/2012 | Sonzala | B60C 23/18 340/449 |
| 2013/0264346 | A1 † | 10/2013 | Donahue | |
| 2014/0305666 | A1 * | 10/2014 | Cordani | A62C 3/16 169/46 |
| 2016/0193489 | A1 * | 7/2016 | Taniguchi | A62C 35/10 169/54 |

FOREIGN PATENT DOCUMENTS

| | | | | |
|---|---|---|---|---|
| DE | 10163527 | | 8/2003 | |
| DE | 10224505 | | 12/2003 | |
| EP | 0094192 | † | 11/1983 | |
| GB | 1357010 | | 6/1974 | |
| GB | 2332522 A | * | 6/1999 | A47J 27/212 |
| SK | 8-2015 | | 9/2016 | |
| WO | WO91/08022 | | 6/1991 | |
| WO | 2011092189 | † | 8/2011 | |
| WO | WO2011/092189 | | 8/2011 | |

OTHER PUBLICATIONS

Machine Translation of CN-203507380-U Description, Jul. 28, 2021, Google Patents, 8 Pages (Year: 2021).*

FM-200 Safety Data Sheet, Aug. 28, 2014, Dupont, 10 Pages (Year: 2014).*

Bourdon Tube Pressure Gauge Type 111.25 CT Contractor Gauge Standard Series, Mar. 2012, WIKA Datasheet 111.25CT, 2 Pages (Year: 2012).*

Josh, JOGR Blazecut Automatic Fire Suppression System, Jun. 2013, Youtube, <https://www.youtube.com/watch?v=Kswau1mGBE8&t=14s> (Year: 2013).*

Android App Enables Pressure Transducer Remote Monitoring and Programming, Aug. 2015, Electronics 360, 2 Pages (Year: 2015).*

Odskusana revolucia v hasiacich systemoch vozidiel sa vola Proteng. Novinkly [online}. Topspeed.sk. Oct. 27, 2013.

The tried and tested revolution in vehicle fire extinguishing systems is called Proteng, 15 pp., Oct. 27, 2013, TOPSPEED.sk, https://www.topspeed.sk/novinky/odskusana-revolucia-v-hasiacich-systemoch-vozidiel-sa-vola-proteng/6048.†

Longoria, Abel, Blazecut Automatic Fire Suppression, 4 pp, Aug. 3, 2013, Texas Vanagons, https://texasvanagons.com/blazecut-automatic-fire-suppression/.†

Cournoyer et al., Fire Modeling of an Emerging Fire Suppression System, 5 pp, Sep. 1, 2014, Journal of Chemical Health and Safety.†

* cited by examiner
† cited by third party

AUTOMATIC FIRE SELF-EXTINGUISHING DEVICE AND FIRE PROTECTION METHOD

CROSS REFERENCE TO RELATED APPLICATION

This application is a national stage entry of PCT/IB2017/053196, filed May 31, 2017, under the International Convention claiming priority over Slovak Patent Application No. PUV 50073-2016, filed May 31, 2016.

FIELD OF THE INVENTION

The invention concerns the construction realization of the automatic fire self-extinguishing device for extinguishing of fire and it also discloses a method of stable fire protection of the objects.

PRIOR ART

Hitherto known devices such as:

hand-held fire extinguishers, mobile fire extinguishers, stable fire extinguishing systems, do not allow effective fire extinguishing at exposed places, spaces and devices, which are not being controlled and protected non-stop.

Important objects require stable fire extinguishing systems, which can ensure permanent and swift readiness to release the fire extinguishing substances to the space of the seat of fire. Stable systems are difficult to install and operate, and they require regular maintenance. Various sensors are used for the detection of fire, whereby the reliability of these sensors significantly determine the speed of intervention, as well as risk of false alarm. In cases of smaller objects or mass-produced objects, such as engines of the vehicles or electric distributors, the standard stable fire extinguishing systems are useless; they occupy too much space and they are complicated and expensive.

Publication WO2011092189 discloses a solution where after the burning through of the hose with the pressure medium of a pyrotechnical substance, it subsequently pushes the extinguishing medium through the opening in the hose to the seat of fire. This solution is complicated and space-consuming; it requires an independent vessel for the extinguishing medium and it includes multiple elements of the system. Similarly, the invention, according to DE10163527, uses sensors and independent vessels of extinguishing medium, which leads to increased costs and demands on space of the system. The solution according to DE10224505, uses a hose with two layers, whereby one layer is perforated and thermally stable and the second layer is sensitive to heat and in a place of fire, it melts and thereby allows the extinguishing medium to flow out of the hose at the correct place. This solution requires complicated and specialized production of the hose, which increases costs.

Such solution is desired and not known, which will be light and simple and which will allow flexible installation in various conditions and which will also allow simple control without the electronic elements.

SUMMARY OF THE INVENTION

The abovementioned deficiencies of hitherto known fire extinguishing devices are significantly remedied by automatic self-extinguishing devices according to this invention, which in essence lies in the fact that the device comprises of closed hose, preferably polyamide hose, which is under pressure filled by extinguishing substance. The hose is dimensioned by its length and diameter in such a way that it forms the cache of the extinguishing substance and no independent pressure vessel with the extinguishing substance is necessary. The extinguishing substance or medium can be on the hexafluoropropane basis. An ending with pressure valve is pressed on one end of the hose; it is closed by the screw and protected by the shrinking PVC protector (also known as "heat-shrink tubing"). An ending is pressed on the other hand of the hose, too; it is closed by the screw and protected by the shrinking PVC protector. It is preferable that the PVC protector functions as an electrical insulator, so that during the placement of the hose to electric distribution or in the vicinity of electric devices (for example car battery in an engine), the metal endings of the hose cannot cause short-circuiting during random touch.

In order to achieve the simple possibility of control and check of the device—that is, check of the presence of the extinguishing device in the hose—it is preferable if the hose is produced from at least partially transparent material. The extinguishing devices are usually produced and distributed as colorless. In order to make the extinguishing substance more visible, it can be colored and during the check, it suffices to check the color of the hose. A control surface with the color corresponding to the color of the extinguishing substance inside the hose can be attached to the hose from the outside. This indirectly controls the pressure of the extinguishing substance; it even controls the slow decrease in the pressure caused by the leak of extinguishing substance; this leak can take a long time without being noticed. The hose, according to this invention, allows visual control of the extinguishing substance.

In case of the use of a liquid extinguishing substance, a small floating body—for example of spherical shape and with strong, for example, reflexive color—can be placed inside the transparent or at least partially transparent hose. During the mounting of the hose to the desired place, the floater is in the highest fold of the hose. In case of a leak of the extinguishing substance, the floater descends, which can be easily, visually checked. The use of at least a partially transparent hose, together with the coloring of the extinguishing substance or together with the floating body, simplifies the functionality of the device. The transparency must be ensured, at least to such a degree that the color or floating body can be seen by the naked eye.

The extinguishing hose has no corrosive effects on the metals; no destructive effects on the plastic; it does not harm electric or electronic devices. There is no danger to the space and devices under the effects of the extinguishing substance. In case of use of the liquid extinguishing substance, this substance evaporates without remnants in case of fire, and there are no remnants of the extinguishing substance which could harm persons or animals in the environment. The deficiencies in the prior state of the art are significantly remedied by the fire protection method of objects by a device according to this invention, which in essence lies in the fact that the hose with the pressurized extinguishing substance is attached in advance in the vicinity of the protected object, and in case of fire, the sealing and/or integrity of the hose is disrupted. After an opening in the hose is created, the extinguishing substance leaks through this opening to the vicinity of the protected object, which extinguishes the fire. Even before the crash or failure itself, the fire can increase the pressure of the extinguishing substance in the hose, which contributes to its quick release.

The hose is disrupted at the temperature higher than 120° C. The hose can be attached directly to the protected object, preferably by means of flexible stretching straps 12.

The automatic fire extinguishing device does not need and does not have any electric or electronic components. This means that the moment of the opening of the hose cannot be communicated to the environment. The opening of the hose is accompanied by strong dynamic reaction; the leaking gas creates a force which tries to move the hose. In case the hose is not attached, it would have caused uncontrolled and, in principle, chaotic movement similar to the movement of a free balloon with leaking air.

Even in case of attachment of the hose, a release of the extinguishing device, the hose moves and deforms in points of attachment during the release of the extinguishing substance. The pressurized hose can cause worries at the part of the personnel in the vicinity of the protected device. In order to allow diagnostics of the approaching moment of opening of the hose, the hose is equipped by the thermometer. It is preferable that the thermometer without electronic assessment is used, for example a thermometer with thermochromic tinction (paint). The layer of the thermochromic tincion is applied onto the surface of the hose directly or by means of adhesive straps 12. Single- or multi-layer groupings of pigments from complex salts can be used. The change of the color points to the increased temperature which signals that the device may be activated. The measuring of the temperature by means of a thermochromic tinction is reliable and does not require maintenance. The temperature is assessed on the surface of the hose, whereby it is precisely the surface of the hose, which is necessary for the activation of the device.

In a preferable arrangement, a pressure sensor can be attached to the hose, whose output is connected to the assessment unit, for example, a panel of the fire protection unit. Sudden loss of pressure signals activation of the device; the hose therefore serves as a fire sensor, too. In this arrangement the device can be connected with an electronic system, too.

In order to allow manual start of the extinguishing, the hose can be equipped with the pyrotechnical substance configured to cause an increase in pressure inside the hose (1). The hose (1) has at least one place with a weakened cross-section configured to allow an outflow of the extinguishing substance during the increase of pressure inside the hose caused by the pyrotechnical substance. The weakened cross-section is, for example, an incomplete perforation. After the manual start of the pyrotechnical substance, the hose is ripped up in the place with weakened cross-section and the extinguishing substance leaks to the environment. In another realization, the hose can be equipped with an outlet valve 13, which is manually controlled, or with bimetal, or with memory metal (SMA), which at a given temperature, opens the valve and the extinguishing substance is released to outer space.

The invention has very simple and effective construction of the device, where the coating of the hose itself forms not only a carrier and cover of the extinguishing substance, but it is also a detection element, whereby the detection of the presence of the flames results from the inherent features of the used material of the hose; thereby the detection ability of the device is unusually reliable and permanent. The device increases the efficacy of the fire protection.

The automatic self-extinguishing fire device can be preferably used in transport technology. It can be placed in engine space where there is a risk of fire. The tests have proven that thanks to the dynamic effect during the ripping of the device, even the small amount of extinguishing substance suffices to extinguish the fire. The hose is attached around the engine and in the vicinity of the components through which the fuel runs, or the hose can be simply attached to the engine bonnet. The advantage of the use of the automatic self-extinguishing fire device is its independence on the systems of the vehicle. Even in case of a crash, when the risk of fire increases and where the power supply is often disconnected, the automatic self-extinguishing fire device is still ready to extinguish.

Automatic self-extinguishing fire device can be preferably used with electrical switchboards, server rooms, computer rooms and so on. In practice, the use proved advantageous mainly for spaces with available free volume smaller than 2 $m^3$.

The use of the automatic self-extinguishing fire device in the conveyor systems, which moves solid fuel to the boilers, proved advantageous, too. Common cause of fire in case of boilers with automatized transport of the solid fuel—for example pellets—is a state when after the outage of electric power supplys, the fire burns into cache through the conveyor. Simple installation of a hoses, according to this invention, to the conveyor extinguishes the progressing fire. The pressure sensor 7 inside the hose can be connected with the control of the conveyor by electric wiring. The sudden loss of pressure signals the activation of the device and thanks to the electric connection of the pressure sensor 7 this state ensures that supply of the further fuel to the place of fire is stopped.

The device can be easily, visually checked; the partial transparency of the hose allows to check the presence of the extinguishing substance, which is a sign of its solidity and pressure. This prevents the unnoticed loss of pressure or leak of the extinguishing substance during the long-term presence of the hose at the place of the application.

BRIEF DESCRIPTION OF THE DRAWINGS

The invention is further disclosed by means of drawings 1 to 3. The used scale of depiction, as well as the ratio of individual elements to the length of the hose, do not have to correspond to the description in the examples; these size ratios and scales cannot be interpreted as limiting the scope of protection.

EXAMPLES OF REALIZATION

Example 1

Figure 1:
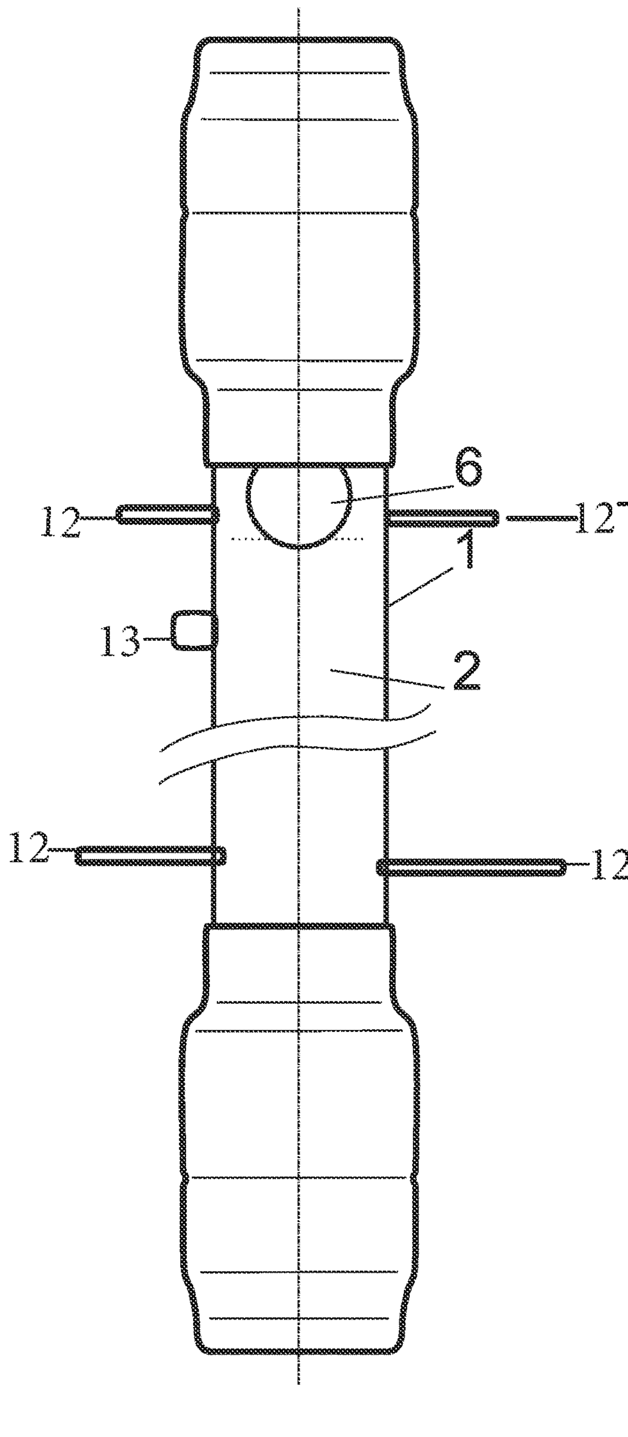
FIG. 1 shows the automatic self-extinguishing device according to the present invention including a PVC protectors on its ends.
Figure 2:
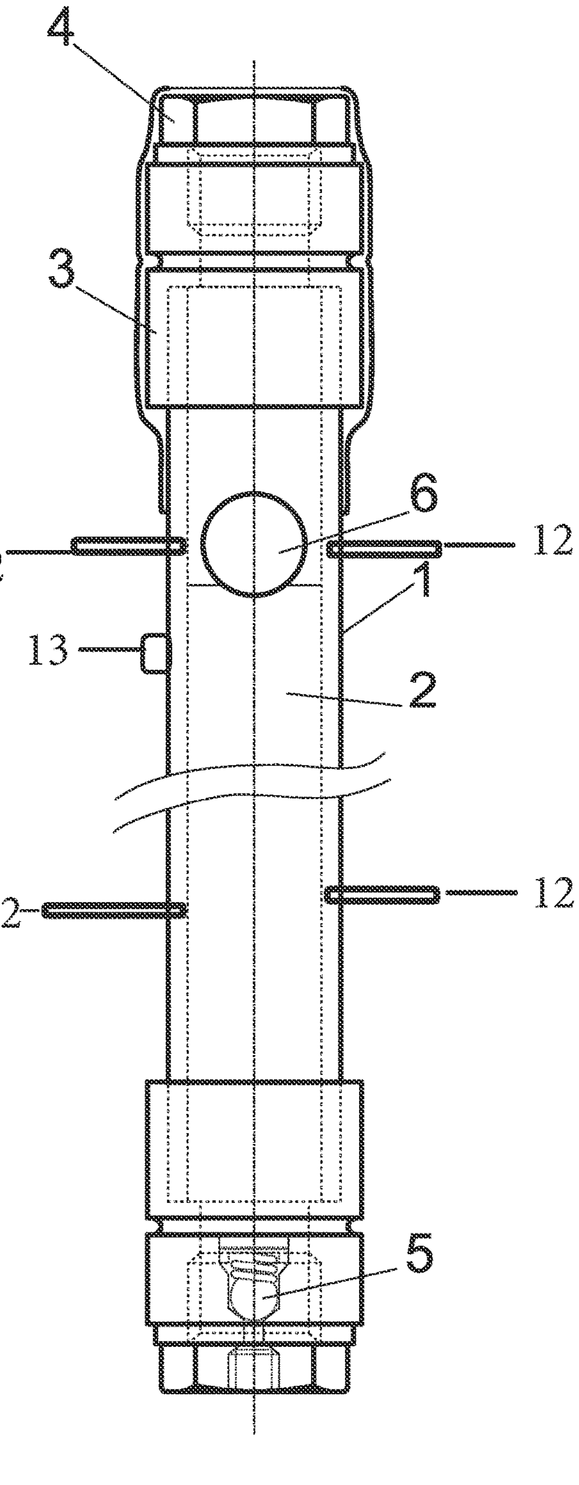
FIG. 2 shows the automatic self-extinguishing device of FIG. 1 showing the protector in the upper part and with the protector removed on the in the lower part.
Figure 3:
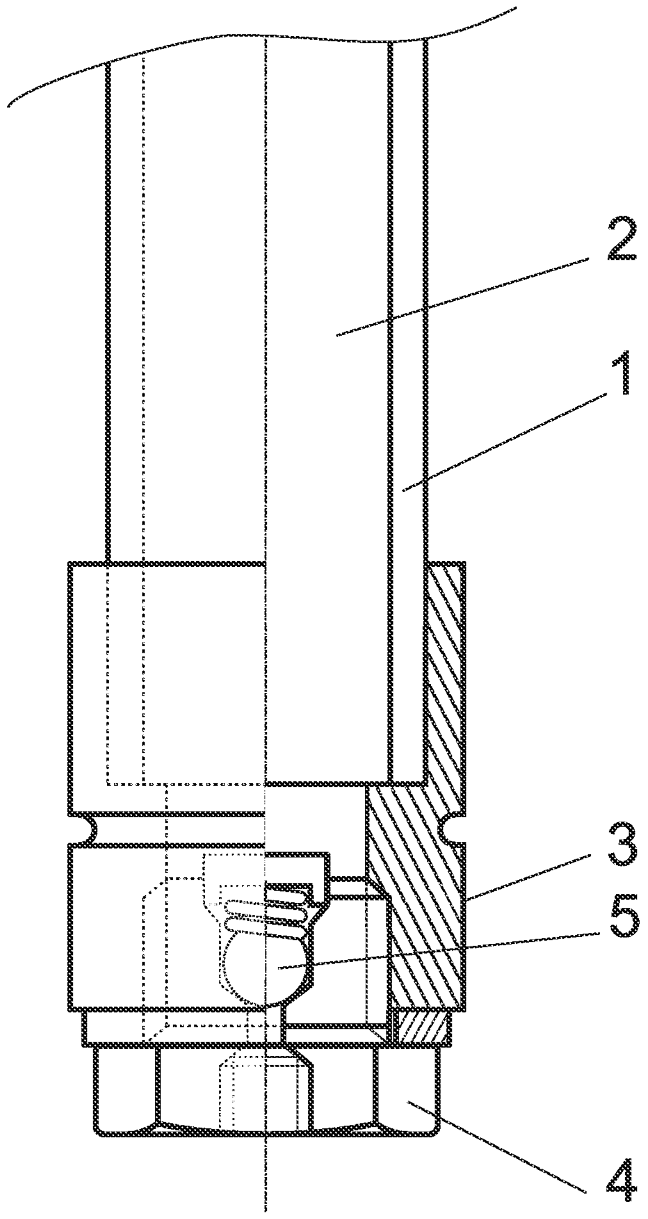
FIG. 3 shows a detail view of the lower part of FIG. 2 showing the hose with the ending, which is pressed on the end of the hose and closed by the screw with a sealing.
Figure 4:
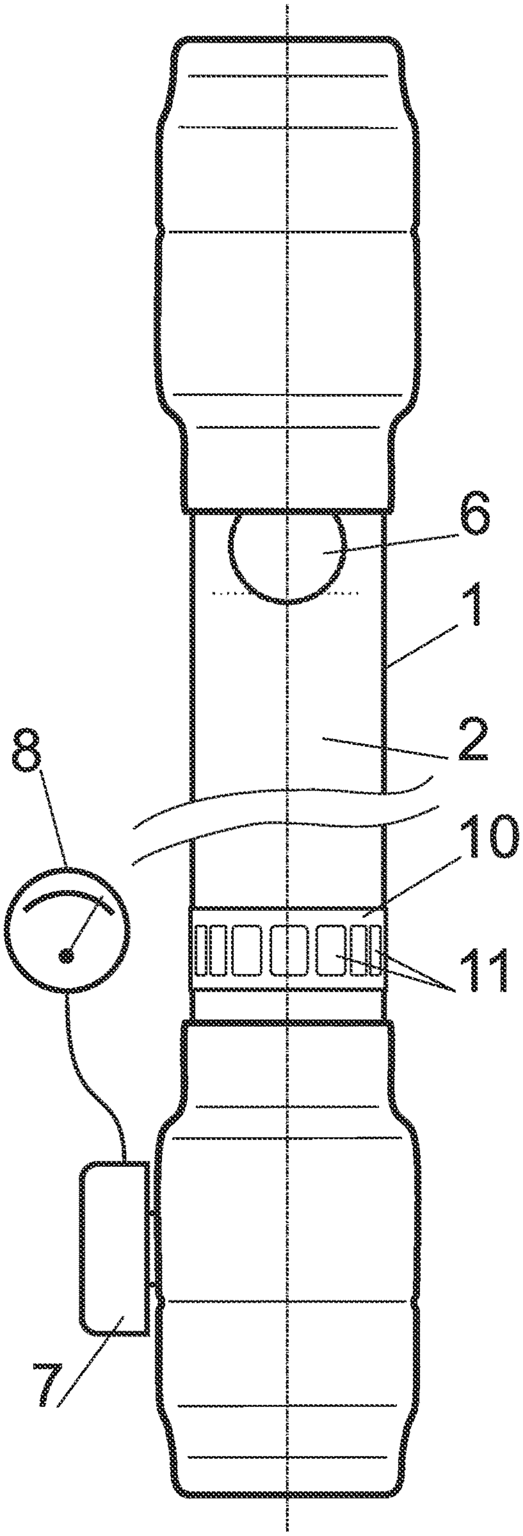
FIG. 4 is a view of an embodiment of the automatic self-extinguishing device according to the present invention showing the protectors on its ends.
Figure 5:
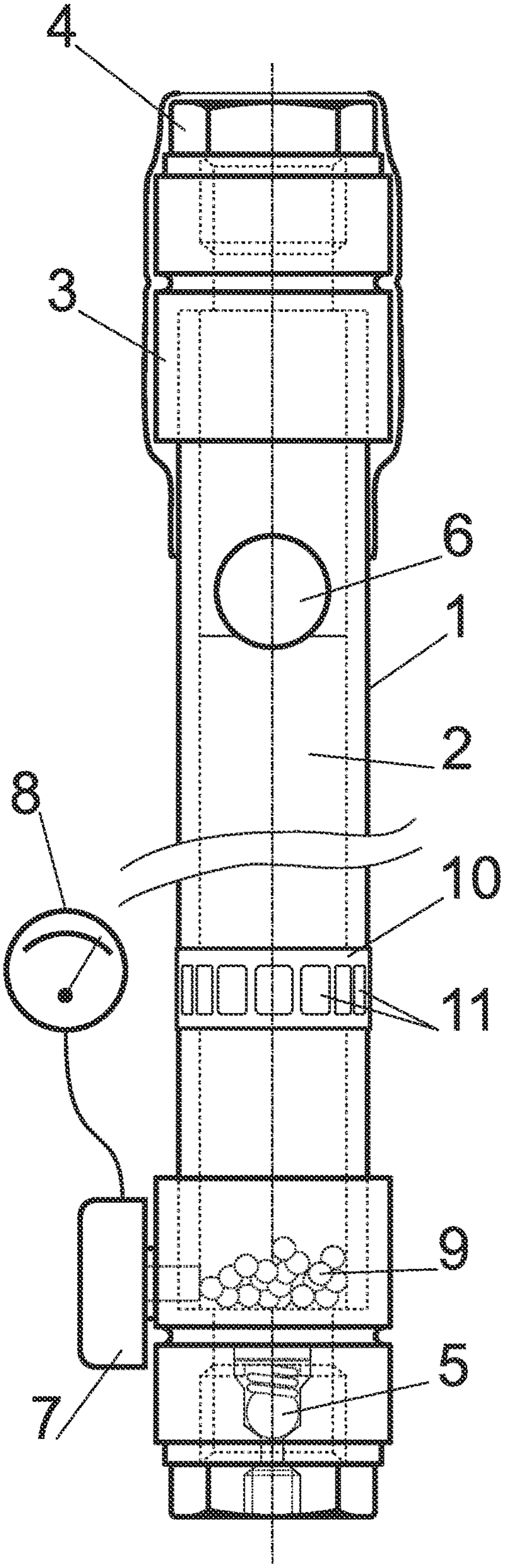
FIG. 5 shows the automatic self-extinguishing device of FIG. 4 with the protector in the upper part and with the protector removed on the in the lower part.
Figure 6:
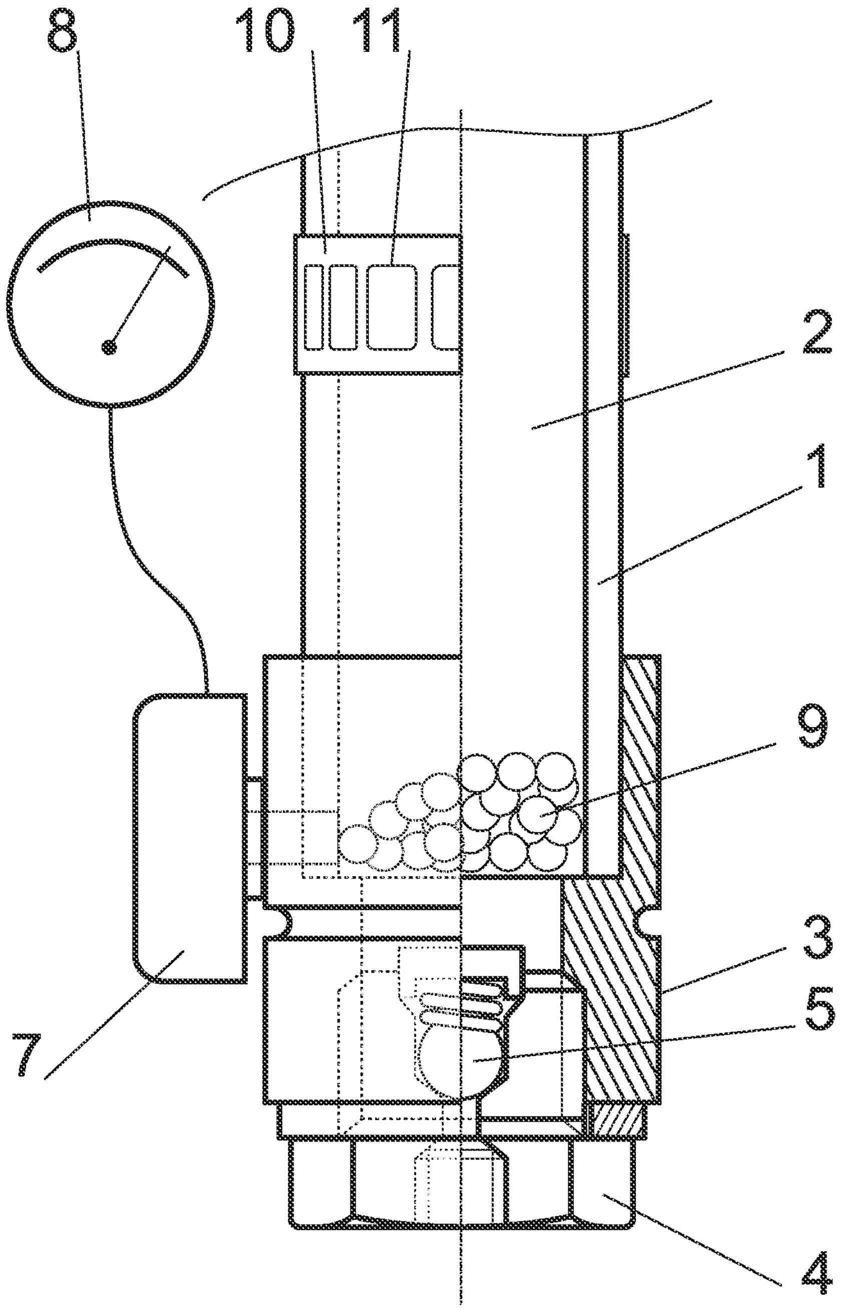
FIG. 6 shows a detailed view of the lower part of FIG. 5 showing the hose with the ending, which is pressed on the end of the hose and closed by the screw with a sealing.

In this example, according to FIGS. 1 to 3, the automatic self-extinguishing fire device includes a polyamide hose 1 with a length at least 400 mm. The hose 1 can have such a length that it contains the necessary protected space and/or device. The polyamide hose 1 is partially transparent, which allows to check the presence of the colored extinguishing substance 2 in it. On the outer coating of the hose 1 there is a sticker with the colored control surface. The color of this sticker corresponds to the color of the hose 1 as perceived by a naked eye.

The diameter of the hose, in this example, is 18 mm. In the hose 1 there is an extinguishing substance 2 under pressure. On one end of the hose, there is a tightly pressed ending 3 closed by the screw 4 and whole ending is equipped by heat-shrinking PVC protector. On the other end of the hose 1 there is a tightly pressed ending 3 closed by the screw 4 and whole ending is equipped by heat-shrinking PVC protector. These protectors ensure that small injuries related to manipulation with the device are avoided, and that the metal endings 3 do not harm sensitive objects in the vicinity of the mounting of the device. These protectors also indicate the integrity of the ends of the hose 1. One end of the hose 1 is equipped by a pressure valve 5 through which the extinguishing substance 2 is filled. Small manometer with the emergency pressure of the extinguishing substance 2 noted can be connected to the ending 3 in order to control the pressure. Manometer's diameter corresponds to the hose's 1 diameter. A small floating body 6, for example of spherical shape and with reflexive color, can be placed inside the transparent or at least partially transparent hose 1.

In a preferable arrangement, a mechanical indicator of pressure, for example, a pressure sensor 7, can be attached to the hose, whose output is connected to a panel 8 of the fire protection unit.

In order to allow manual start of the extinguishing, the hose 1 can be equipped with the pyrotechnical substance 9 for sudden increase of the pressure.

The hose 1 is equipped with a thermometer 10. It is preferable the thermometer without electronic assessment is used, for example a thermometer with thermochromic tinction (paint) 11.

Automatic self-extinguishing fire device is attached horizontally or vertically or in other direction to the solid parts of the space or device, which is to be protected from fire.

In case of the fire (direct flame) and temperature more than 120° C., the hose 1 cracks up and the extinguishing substance 2 gets to the seat of fire and it extinguishes the fire. The accessory to fire hose 1 is composed of 6 pieces of stretchable PVC straps 12, thanks to which it is anchored at a protected device and/or space.

The softened polyamide wall of the hose 1 cracks up in the places of largest heat stress and it releases the extinguishing substance to the space. This effectively and reliably extinguishes even a budding fire. The extinguishing substance 2 can be solid, liquid or gas substance. The amount of the extinguishing substance 2 can be regulated by the length and diameter of the hose 1. In the early stages, the fire produces a heat which increases the pressure in the hose 1 which contributes to sudden punctual disruption of the integrity of the hose 1. The outflowing extinguishing substance 2 has a high flow rate and it targets large spaces.

Example 2

Automatic self-extinguishing fire device is placed in the engine of the bus. The hose 1 is attached in the vicinity of the device; it encircles its circumference and runs near the fuel pump and fuel filters.

Example 3

Automatic self-extinguishing fire device is placed in the engine of the passenger car. Grips are pressed on the lower side of the bonnet and the hose 1 clipped into them. During the fire in engine space, the bonnet captures the dynamic reaction of the hose 1 and directs the outflow of the extinguishing substance 2 towards the engine.

Example 4

In this example, the automatic self-extinguishing fire device is placed in the electric switchboard of the flat house.

Example 5

The hose 1 of the automatic self-extinguishing fire device is inserted to the conveyor of the wooden pellets which transports the pellets into the boiler.

INDUSTRIAL APPLICABILITY

Industrial applicability is obvious. According to this invention, it is possible to industrially and repeatedly produce and use an automatic self-extinguishing fire device for protection of objects and spaces, for example, engines, electric switchboards and so on.

LIST OF RELATED SYMBOLS

1—hose
2—extinguishing substance or medium
3—ending
4—screw
5—pressure valve
6—floating body
7—pressure sensor
8—panel
9—pyrotechnical substance
10—thermometer
11—thermochromic tinction.

The invention claimed is:

1. An automatic self-extinguishing fire device to protect an object, the device consisting of:
   - a colored fire-extinguishing substance,
   - a hose having a straight tubular body having an entire length that is linear from a first end of the hose to a second end of the hose;
   - a first pressing ending connected to the first end of the hose and a second pressing ending connected to the second end of the hose, wherein the hose is closed at the first end and the second end by the first pressing ending and the second pressing ending respectively,
   - wherein the colored fire-extinguishing substance is inside the hose, wherein the first pressing ending and the second pressing ending are made of a metallic material;
   - a first closing screw connected to the first pressing ending at a first connection and a second closing screw connected to the second pressing ending at a second connection;
   - a first protector made of a heat shrinkable material covering the first connection and a second protector made of heat shrinkable material covering the second connection, wherein the hose does not touch the first protector or the second protector;

a pressure valve for filling by the colored fire-extinguishing substance that is located by one of the pressing endings;

a spherically shaped floating body located inside the hose, the spherically shaped floating body having a reflexive color, wherein the spherically shaped floating body descends in the hose;

a plurality of flexible stretching straps attached to the hose, the flexible straps are adapted to be wrapped around the object to be protected;

wherein the automatic self-extinguishing fire device is free of electric or electronic components;

wherein a sealing or integrity of the hose is disrupted under effects of a fire;

wherein the hose is at least partially flexible and the colored fire-extinguishing substance in the hose is under pressure;

wherein the hose is transparent in order to observe an inner content of the hose;

wherein the hose includes a pyrotechnical substance configured to cause an increase in pressure inside the hose to manually activate the colored fire-extinguishing substance;

the hose has at least one place with a weakened cross-section configured to allow an outflow of the colored fire-extinguishing substance during the increase in pressure inside the hose caused by the pyrotechnical substance;

wherein after manually activating the pyrotechnical substance, the hose is torn at the weakened cross-section and the colored fire-extinguishing substance leaks into an environment; and wherein the hose has a control surface with a color corresponding to a color of the colored fire-extinguishing substance, as perceived from an outside, on an outer surface of the hose.

2. An automatic self-extinguishing fire device to protect an object, the device consisting of:

a colored fire-extinguishing substance, a hose having a straight tubular body having an entire length that is linear from a first end of the hose to a second end of the hose;

a first pressing ending connected to the first end of the hose and a second pressing ending connected to the second end of the hose, wherein the colored fire-extinguishing substance is inside the hose, wherein the first pressing ending and the second pressing ending are made of a metallic material;

a first closing screw connected to the first pressing ending at a first connection and a second closing screw connected to the second pressing ending at a second connection;

a first protector made of a heat shrinkable material covering the first connection and a second protector made of heat shrinkable material covering the second connection, wherein the hose does not touch the first protector or the second protector;

a pressure valve for filling by the colored fire-extinguishing substance that is located by one of the pressing endings;

a spherically shaped floating body located inside the hose, the spherically shaped floating body having a reflexive color, wherein the spherically shaped floating body descends in the hose;

a plurality of flexible stretching straps attached to the hose, the flexible straps are adapted to be wrapped around the object to be protected;

wherein the automatic self-extinguishing fire device is free of electric or electronic components;

wherein a sealing or integrity of the hose is disrupted under effects of a fire;

wherein the hose is at least partially flexible and the colored fire-extinguishing substance in the hose is under pressure;

wherein the hose is transparent in order to observe an inner content of the hose;

wherein the colored fire-extinguishing substance is hexafluoropropane; and wherein the hose includes a pyrotechnical substance configured to cause an increase in pressure inside the hose to manually activate the colored fire-extinguishing substance;

wherein the hose includes a thermometer without an electronic component located on an outer surface; the thermometer includes a thermochromic tinction;

the hose has at least one place with a weakened cross-section configured to allow an outflow of the colored fire-extinguishing substance during the increase in pressure inside the hose caused by the pyrotechnical substance;

wherein after manually activating the pyrotechnical substance, the hose is torn at the weakened cross-section and the colored fire-extinguishing substance leaks into an environment; and wherein the hose has a control surface with a color corresponding to a color of the colored fire-extinguishing substance, as perceived from an outside, on an outer surface of the hose.

3. The automatic self-extinguishing fire device according to claim 1, wherein the colored fire-extinguishing substance is a liquid.

4. The automatic self-extinguishing fire device according to claim 1, wherein the hose is made from a polyamide.

5. The automatic self-extinguishing fire device according to claim 1, wherein at least one of the pressing endings of the hose includes a pressure sensor.

6. The automatic self-extinguishing fire device according to claim 5, wherein the pressure sensor is connected to a panel.

7. The automatic self-extinguishing fire device according to claim 1, wherein the hose is at least 400 mm long.

8. The automatic self-extinguishing fire device according to claim 1, wherein the hose has a diameter of at least 18 mm.

9. An automatic self-extinguishing fire device to protect an object, the device consisting of:

a colored fire-extinguishing substance;

a hose having a straight tubular body having an entire length that is linear from a first end of the hose to a second end of the hose;

a first pressing ending connected to the first end of the hose and a second pressing ending connected to the second end of the hose, wherein the colored fire-extinguishing substance is inside the hose, wherein the first pressing ending and the second pressing ending are made of a metallic material;

a first closing screw connected to the first pressing ending at a first connection and a second closing screw connected to the second pressing ending at a second connection;

a first protector made of a heat shrinkable material covering the first connection and a second protector made of heat shrinkable material covering the second connection, wherein the hose does not touch the first protector or the second protector;

a pressure valve for filling by the colored fire-extinguishing substance that is located by one of the pressing endings;

a spherically shaped floating body located inside the hose, the spherically shaped floating body having a reflexive color, wherein the spherically shaped floating body descends in the hose;

a plurality of flexible stretching straps attached to the hose, the flexible straps are adapted to be wrapped around the object to be protected;

an outlet valve connected to the hose, the outlet valve including a bimetal or memory metal that at a set temperature opens the outlet valve and the colored fire-extinguishing substance is released outside the hose;

wherein the automatic self-extinguishing fire device is free of electric or electronic components;

wherein a sealing or integrity of the hose is disrupted under effects of a fire;

wherein the hose is at least partially flexible and the colored fire-extinguishing substance in the hose is under pressure;

wherein the hose is transparent in order to observe an inner content of the hose;

wherein the hose includes a pyrotechnical substance configured to cause an increase in pressure inside the hose to manually activate the colored fire-extinguishing substance;

the hose has at least one place with a weakened cross-section configured to allow an outflow of the colored fire-extinguishing substance during the increase in pressure inside the hose caused by the pyrotechnical substance;

wherein after manually activating the pyrotechnical substance, the hose is torn at the weakened cross-section and the colored fire-extinguishing substance leaks into an environment; and wherein the hose has a control surface with a color corresponding to a color of the colored fire-extinguishing substance, as perceived from an outside, on an outer surface of the hose.

* * * * *